United States Patent
Ravestein et al.

(10) Patent No.: US 11,453,315 B2
(45) Date of Patent: Sep. 27, 2022

(54) SEAT DEVICE AND VEHICLE

(71) Applicant: DAIMLER AG, Stuttgart (DE)

(72) Inventors: Matthijs Ravestein, Böblingen (DE); Jan Rath, Böblingen (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 0 days.

(21) Appl. No.: 17/278,066

(22) PCT Filed: Sep. 17, 2019

(86) PCT No.: PCT/EP2019/074849
§ 371 (c)(1),
(2) Date: Mar. 19, 2021

(87) PCT Pub. No.: WO2020/058260
PCT Pub. Date: Mar. 26, 2020

(65) Prior Publication Data
US 2021/0347285 A1    Nov. 11, 2021

(30) Foreign Application Priority Data
Sep. 21, 2018  (DE) .................. 10 2018 007 523.1

(51) Int. Cl.
*B60N 2/20* (2006.01)
*B60N 2/14* (2006.01)
(Continued)

(52) U.S. Cl.
CPC ............. *B60N 2/203* (2013.01); *B60N 2/143* (2013.01); *B60N 2/3009* (2013.01); *B60N 2/309* (2013.01); *B60N 2/767* (2018.02); *B60N 2/809* (2018.02)

(58) Field of Classification Search
CPC ................................ B60N 2/203; B60N 2/143
See application file for complete search history.

(56) References Cited

U.S. PATENT DOCUMENTS

| 8,935 A | 5/1852 | Buell |
| 19,910 A | 4/1858 | Buzzell |

(Continued)

FOREIGN PATENT DOCUMENTS

| DE | 3643729 C2 | 8/1995 |
| DE | 102015103392 A1 | 9/2015 |

(Continued)

OTHER PUBLICATIONS

International Search Report dated Dec. 6, 2019 in related/corresponding International Application No. PCT/EP2019/076849.

(Continued)

*Primary Examiner* — David R Dunn
*Assistant Examiner* — Tania Abraham
(74) *Attorney, Agent, or Firm* — Patent Portfolio Builders PLLC (57) ABSTRACT

A vehicle seat device includes a seat cushion having a cushion front side and cushion rear side both running in the transverse direction of the seat device. The device also includes a seat back having two backrest edge sides opposite each other and each running in the transverse direction of the seat device. The seat back is arrangeable on the cushion front and rear sides of the seat cushion in order to change a seat direction. The seat back is mounted so as to be rotatable by at least 180° around a transverse axis in order to change the seat direction. At least one headrest unit is arranged on the seat back in a displaceable manner in such a way that it can be displaced beyond the backrest edge side facing away from the seat cushion in each case and can be displaced back under this backrest edge side.

17 Claims, 10 Drawing Sheets

(51) Int. Cl.
B60N 2/30 (2006.01)
B60N 2/75 (2018.01)
B60N 2/809 (2018.01)

(56) References Cited

U.S. PATENT DOCUMENTS

| | | | |
|---|---|---|---|
| 106,615 A | 8/1870 | Pease | |
| 166,455 A | 8/1875 | Edwards | |
| 364,011 A | 5/1887 | Hale | |
| 1,734,214 A * | 11/1929 | Jones | B60N 2/203 296/65.13 |
| 2,545,608 A * | 3/1951 | Edwards | B60N 2/203 297/104 |
| 2,642,922 A * | 6/1953 | Monroe | B60N 2/34 297/375 |
| 3,986,218 A * | 10/1976 | Mizelle | A47C 17/16 5/45 |
| 6,715,825 B2 | 4/2004 | Tame | |
| 9,150,178 B1 | 10/2015 | Jayasuriya et al. | |

FOREIGN PATENT DOCUMENTS

| | | |
|---|---|---|
| FR | 2671530 A1 | 7/1992 |
| JP | 2003237530 A | 8/2003 |

OTHER PUBLICATIONS

Office Action created on Jan. 22, 2021 in related/corresponding DE Application No. 10 2018 007 523.1.
Office Action created on May 20, 2019 in related/corresponding DE Application No. 10 2018 007 523.1.
Written Opinion dated Dec. 6, 2019 in related/corresponding International Application No. PCT/EP2019/076849.

* cited by examiner

SEAT DEVICE AND VEHICLE

BACKGROUND AND SUMMARY OF THE INVENTION

Exemplary embodiments of the invention relate to a seat device and a vehicle having such a seat device.

U.S. Pat. No. 6,715,825 B2 describes a seat arrangement adjustable in several positions for use in a motor vehicle. The seat arrangement comprises a seat cushion and a seat back. The seat cushion and seat back are supported above the floor of the vehicle by a pair of seat supports. The seat cushion comprises a front portion and an opposing rear portion. The seat back comprises an upper portion and a lower portion arranged on the seat cushion. The seat arrangement can be positioned in a plurality of upright and flat positions. It comprises a pair of connecting elements for positioning the seating arrangement in a forward or rearward upright seating position, or in a first or second flat position. In the flat positions, the seat back extends horizontally from either the front portion or the rear portion of the seat cushion.

Exemplary embodiments of the invention are directed to a seat device that is improved compared to the prior art and a vehicle having such a seat device that is improved compared to the prior art.

A seat device, in particular a vehicle seat device for a vehicle, comprises a seat cushion having a cushion front side running in the transverse direction of the seat device and a cushion rear side running in the transverse direction of the seat device, and a seat back having two opposite backrest edge sides each running in the transverse direction of the seat device, wherein the seat back can be arranged on the cushion front side and on the cushion rear side of the seat cushion in order to change a seat direction. That means, depending on the seat direction, the seat back is arranged either on the cushion front side or on the cushion rear side. In this case, the seat back can be rotated by at least 180° about a transverse axis in order to change the seat direction. The seat back thus has a backrest front side provided for an occupant to lean against and a backrest rear side facing away from the front side and not intended for leaning against, wherein the seat back is rotatably mounted around the transverse axis for changing the seat direction in such a way that both when the seat back is arranged on the cushion front side of the seat cushion and when the seat back is arranged on the cushion rear side of the seat cushion, the backrest front side is aligned in the seat direction, i.e., facing towards the seat cushion. According to the invention, at least one headrest unit is arranged in a displaceable manner on the seat back in such a way that it can be displaced beyond the backrest edge side facing away from the seat cushion in each case and can be displaced back under this backrest edge side.

The seat device can be designed as a single-seater or as a multiple-seater, i.e., as a single vehicle seat, having only one seating position, i.e., provided for only one occupant, or as a bench seat, in particular a vehicle bench seat, having multiple seating positions, i.e., provided for multiple occupants sitting next to one another.

The seat device can be designed, for example, as a front or rear vehicle seat or as a front or rear bench seat, i.e., arranged in a first, second or further row of seats of the vehicle. The vehicle can, for example, have one or more such seat devices.

The solution according to the invention offers a flexible seating concept, which is particularly advantageous, for example, for a vehicle that can perform an autonomous driving operation. By way of example, the seat device is provided for a vehicle driver who, for example, must sit at times in the direction of travel of the vehicle in order to guide the vehicle, but who can also at times, in particular during autonomous driving operation, adopt a different seat direction, for example facing other occupants. This is made possible in a simple manner by the seat device according to the invention, in that the seat back is rotated by at least 180° from the position arranged on the rear side of the cushion and arranged on the front side of the cushion, as a result of which an opposite seat direction is achieved, in the example described thus a seat direction oriented opposite to the direction of travel. A corresponding change back of the seat direction is of course equally possible.

A further advantageous application of the solution according to the invention is, for example, in an autonomous vehicle, which can be used in various ways. By way of example, if the vehicle is used for so-called pooling, in which the vehicle is used by several persons who do not know each other and board along a route travelled by the vehicle, the greatest possible privacy can be achieved by having all persons sit in the same seating direction and thus not facing each other. If the vehicle is privately rented, for example, also referred to as individual mode, then the people travelling who know each other usually want to sit facing each other in order to better communicate and/or interact with each other. For this purpose, the solution according to the invention allows the direction of seating to be changed in a simple manner so that the persons travelling in the vehicle can sit facing each other.

The solution according to the invention thus enables a flexible seat arrangement whose seat direction can be changed, for example, depending on a respective number of persons travelling in the vehicle and their respective needs. In the case of the seat device according to the invention, two opposite seat directions are integrated, such that no further components are required, no replacement of components is necessary and no removal and reverse installation of the entire seat device is required. This also provides improved safety, since no loosening and reattachment of the seat device to the vehicle is required, thereby eliminating the risk of incorrect attachment to the vehicle. The solution according to the invention is thus minimalist, involves little effort in manufacture and operation, is inexpensive and has a low weight which, for example, is not or only insignificantly higher than that of conventional vehicle seats.

Advantageously, only one headrest unit is provided per seat, correspondingly only one headrest unit in the case of a seat device designed as a single seat and one headrest unit per seat in the case of a seat device designed as a multiple-seater. This headrest unit is then pushed upwards beyond the respective backrest edge side facing away from the seat cushion in accordance with the set seat direction and thus in accordance with the respective orientation of the seat back. During the change in the seat direction, the headrest unit is pushed back accordingly and, once the seat back has been realigned on the seat cushion, is pushed upwards beyond the other side of the backrest edge now facing away from the seat cushion.

Alternatively, a headrest unit can be provided for the respective seat on each of the two backrest edge sides, which can be pushed in the direction of the seat back and under the backrest edge side, for example into the seat back when this backrest edge side faces the seat cushion.

In particular, the seat back is rotatably mounted on two lateral pivot arms, wherein the transverse axis, about which the seat back is rotatable, can be pivoted by means of the pivot arms in the direction of the cushion front side and in the direction of the cushion rear side. This makes it easy to move the rotated seat back from the cushion front side to the cushion rear side and vice versa.

In one possible embodiment, a length of the pivot arms can be changed. In particular, this allows a backrest inclination angle of the seat back to be adjusted.

In one possible embodiment, a cushion inclination angle of the seat cushion is adjustable. In this way, the cushion inclination angle can be adjusted in particular in accordance with the arrangement of the seat back on the front side or rear side of the cushion, such that the respective side of the seat cushion, on which the seat back is positioned, is arranged somewhat lower than the respective other side of the seat cushion, for example.

The possibility of adjusting the angle of inclination of the cushion and/or the angle of inclination of the backrest makes it possible, in particular, to achieve a comfortable and ergonomically favorable seat setting for each set seat direction.

In one possible embodiment, the seat device has at least one pivotable armrest. This increases occupant comfort, wherein only one armrest or for each arm of the occupant only one armrest is required at a time, since the armrest is pivotable and thus can be pivoted to match the orientation and positioning of the seat back. By way of example, the armrest is pivotably arranged on the seat back or on the pivot arm.

In one possible embodiment, the seat device has at least one three-point seat belt device having two belt buckles. The three-point seat belt device optimizes occupant safety and/or complies with corresponding occupant safety regulations. The two belt buckles make it possible for a belt tongue, depending on the orientation and arrangement of the seat back on the front or rear side of the cushion, to be engaged in the belt buckle which is located in the area of the seat cushion and the seat back in each case, in order to enable a three-point run of the belt strap corresponding to a conventional three-point seat belt, i.e., with a lap belt section and a shoulder belt section.

The belt buckles are each arranged, for example, in the region of one of the backrest edge sides of the seat back, such that one of the two belt buckles is always positioned in the region of the seat cushion in accordance with the orientation and positioning of the seat back on the cushion front side or cushion rear side.

In another embodiment, for example, one of the belt buckles is arranged in the area of the cushion front side and the other belt buckle is arranged in the area of the cushion rear side. In this case, the belt buckle is used in the area the seat back is positioned according to the seat direction set in each case. That means, if the seat backrest is arranged on the rear side of the cushion, the belt buckle is used in the area of the rear side of the cushion, and if the seat backrest is arranged on the front side of the cushion, the belt buckle is used in the area of the front side of the cushion.

With this solution, i.e., the arrangement of the belt buckles in or on the seat cushion, the belt buckles are advantageously arranged in such a way that an occupant does not have to sit on one of the belt buckles and is disturbed by it. This risk can be at least largely eliminated by the first-mentioned solution, i.e., by arranging the belt buckles in or on the seat backrest in the area of the respective backrest edge.

A vehicle according to the invention comprises at least one such seat device. The resulting advantages have already been described. Particularly advantageously, the vehicle is an autonomous vehicle or a vehicle which is at least temporarily capable of carrying out autonomous driving operation. The seat device is positioned, for example, in a front row of seats or in a rear row of seats, i.e., for example, second, third or further rows of seats. When arranged in the front row of seats, the seat device can form a driver's seat or passenger seat, for example, or a normal passenger seat in a fully autonomous vehicle.

The disclosed solution allows the direction of the seat and thus the orientation of the occupants in the vehicle to be changed in a simple manner while the number of seats remains the same. In order to be able to enter and leave the vehicle both when the seat device is set in one seating direction and in the opposite seating direction, the vehicle advantageously has a correspondingly large door opening or several such door openings. This can be implemented particularly advantageously, for example, with sliding doors or wing doors or normal vehicle doors that swing open particularly far, i.e., which pivot about a vertical door axis.

The seat device can be designed, for example, as a single-seater or a multiple-seater, i.e., for example as a single seat or bench seat.

In one possible embodiment, the seat device is arranged on a vehicle floor in a displaceable manner. This also makes it possible to adjust the legroom, in particular when the seat direction is changed. In particular, when the seat direction is set in such a way that occupants are facing each other, sufficient legroom can thus be achieved for these occupants.

Exemplary embodiments of the invention are explained in more detail below with reference to the drawings.

BRIEF DESCRIPTION OF THE DRAWING FIGURES

Here are shown.

Parts corresponding to one another are provided with the same reference numerals in all figures.

DETAILED DESCRIPTION

FIGS. 1 to 11 show embodiments of a seat device 1 designed here as a vehicle seat device for a vehicle. The seat device 1 has a longitudinal direction x, a transverse direction y, and a vertical direction z. The seat device 1 depicted here as an example and described below allows a change of a seat direction SR, more precisely a reversal of the seat direction SR, as shown in particular in FIG. 1.

In the depicted examples, the seat device 1 is arranged in the vehicle, wherein only a vehicle floor FB is shown of the vehicle for reasons of clarity. In the depicted examples, the seat device 1 is arranged in the vehicle in such a way that the longitudinal direction x of the seat device 1 corresponds to a longitudinal direction of the vehicle and thus to a direction of travel FR of the vehicle. The transverse direction y of the seat device 1 thus corresponds to a transverse direction of the vehicle and the vertical direction z of the seat device 1 corresponds to a vertical direction of the vehicle. The seat direction SR can thus be adjusted by means of this seat device 1 in such a way that it is aligned in the direction of travel FR, i.e., in the direction of a vehicle front, or is aligned opposite to the direction of travel FR, i.e., in the direction of a vehicle rear.

The seat device 1 comprises a seat cushion 2, which has a cushion front side 2.1 running in the transverse direction y of the seat device 1 and a cushion rear side 2.2 running in the transverse direction y of the seat device 1. In the depicted example, this seat cushion 2 is arranged on a seat frame 3, which is connected to the vehicle floor FB, advantageously is connected in a displaceable manner, in particular in the longitudinal direction x and thus is connected to the vehicle floor FB in a displaceable manner in the longitudinal direction of the vehicle, i.e., in the direction of travel FR or against the direction of travel FR, for example via rails attached to the vehicle floor FB.

By way of example, the seat cushion 2 has a frame in which it is inserted or on which it is arranged and via which it is connected, advantageously pivotably, to the seat frame 3.

The seat device 1 further comprises a seat back 4 having two opposite backrest edge sides 4.1, 4.2 each extending in the transverse direction y of the seat device 1. To change the seat direction SR, the seat back is attached to the cushion front side 2.1 of the seat cushion 2 in order to adjust the one seat direction SR, as shown in particular in FIG. 1 on the left and in FIG. 2, or on the cushion rear side 2.2 of the seat cushion 2 in order to adjust the opposite seat direction SR, as shown in particular in FIG. 1 on the right and in FIG. 4.

Figure 1:
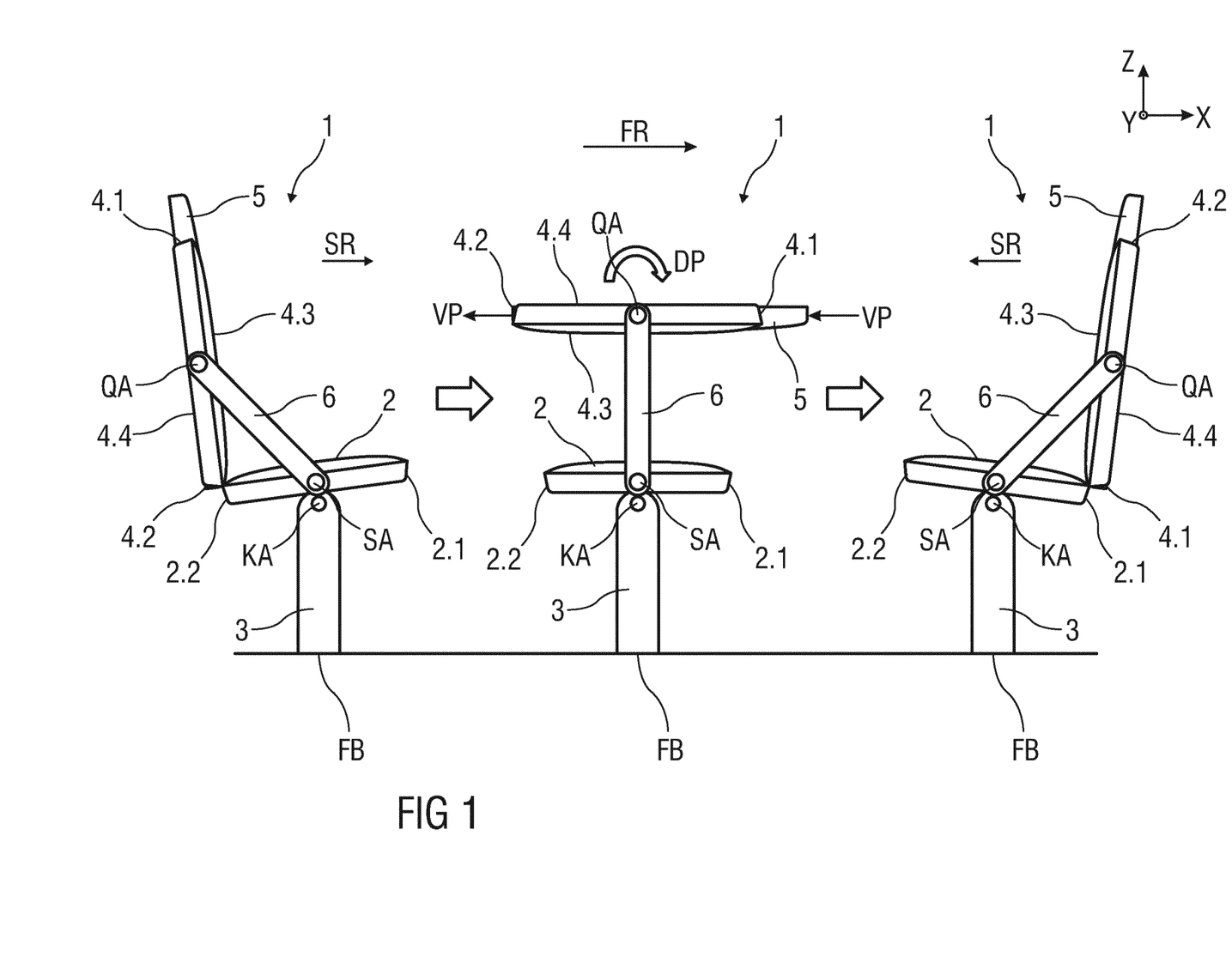
FIG. 1 schematically, a change of a seating direction in a seat device.
Figure 2:
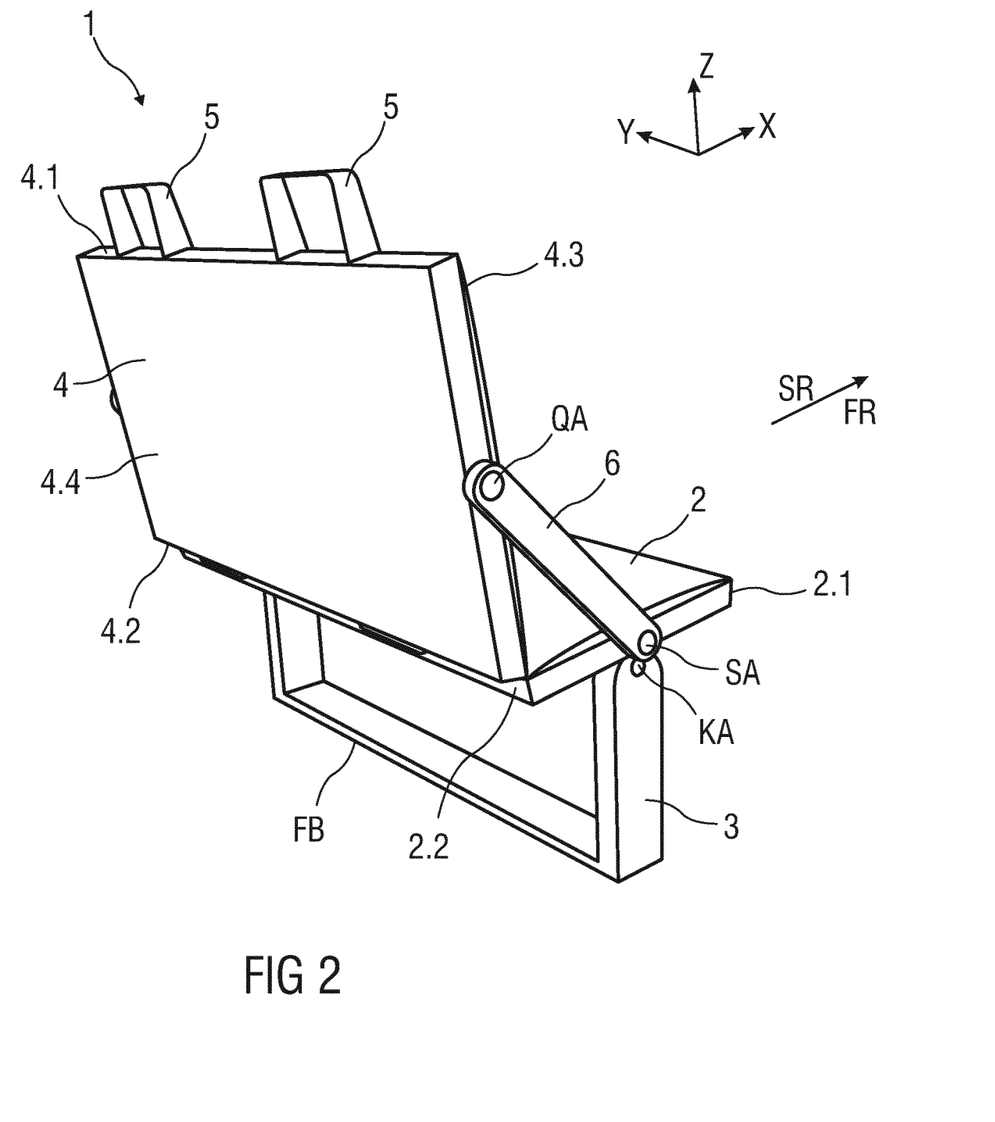
FIG. 2 schematically, a seat device which is set in one of two possible seat directions, FIG. 3 schematically, the seat device from FIG. 2 during a change of the seat direction, FIG. 4 schematically, the seat device from FIG. 2, set in the other seat direction, FIG. 5 schematically, a seat device having two depicted seat direction settings, FIG. 6 schematically, a seat cushion inclination adjustment of a seat device, FIG. 7 schematically, a further depiction of a seat device adjustable in two seat directions, FIG. 8 schematically, a seat back of a seat device having a displaceable headrest unit, FIG. 9 schematically, a seat device adjustable in two seat directions having length-adjustable pivot arms, FIG. 10 schematically, a seat device adjustable in two seat directions having an armrest, and FIG. 11 schematically, a seat device having two depicted seat direction settings and a three-point seatbelt device.
Figure 3:
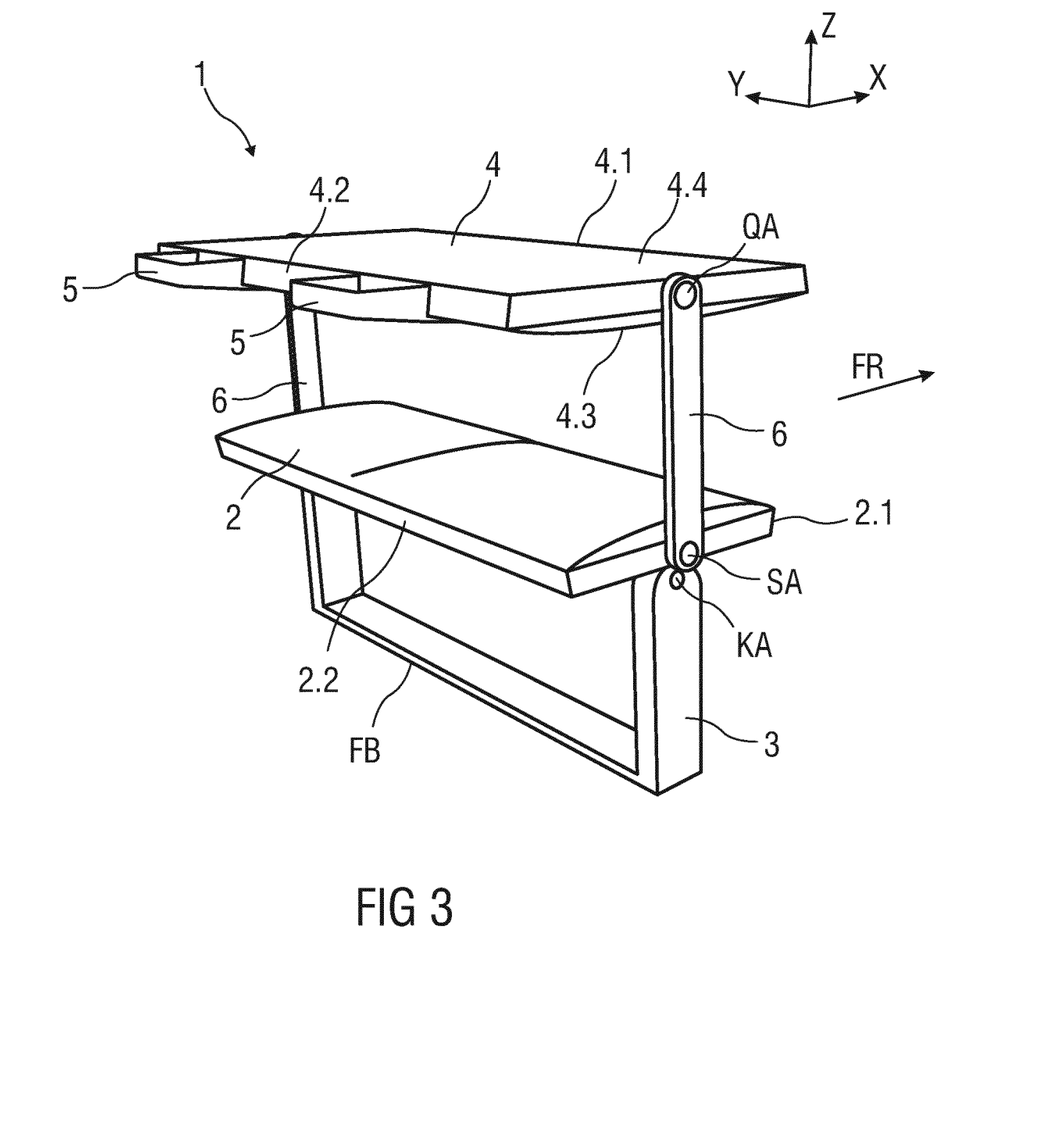
Figure 4:
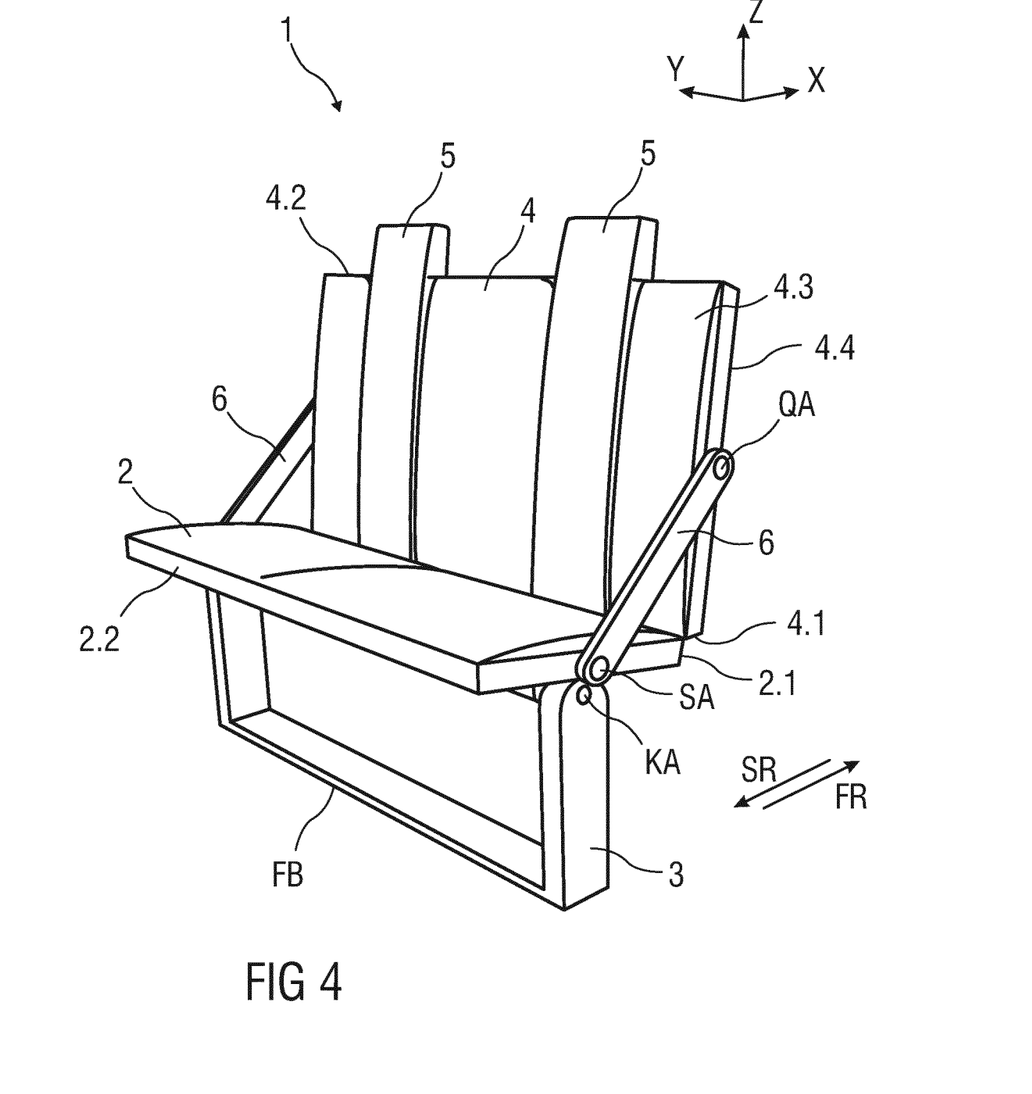

For this purpose, i.e., in particular for changing the seat direction SR, the seat back 4 is mounted rotatably by at least 180° about a transverse axis QA, which runs in the transverse direction y of the seat device 1, as shown in particular in FIG. 1 from left to right and in FIGS. 2 to 4 and shown schematically in FIG. 1 centrally by means of a rotary arrow DP. FIG. 1 and FIGS. 2 to 4 show a sequence of this change in the seat direction SR. In FIG. 1 on the left and in FIG. 2, the seat back 4 is arranged on the cushion rear side 2.2. In FIG. 1 in the center and in FIG. 3, the seat back 4 is already detached from the cushion rear side 2.2 and half rotated, i.e., for example, by approximately 90°. In FIG. 1 on the right and in FIG. 4, the seat back 4 is fully rotated, i.e., by at least 180°, and arranged on the cushion front side 2.1.

The seat back 4 thus has a backrest front side 4.3 provided for an occupant I to lean against and a backrest rear side 4.4 facing away from it and not provided for leaning against, wherein the seat back 4 is rotatably mounted around the transverse axis QA for changing the seat direction SR in such a way that both when the seat back 4 is arranged on the cushion front side 2.1 of the seat cushion 2, and when the seat back 4 is arranged on the cushion rear side 2.2 of the seat cushion 2, the backrest front side 4.3 is aligned in the seat direction SR, i.e., facing towards the seat cushion 2.

Figure 11:
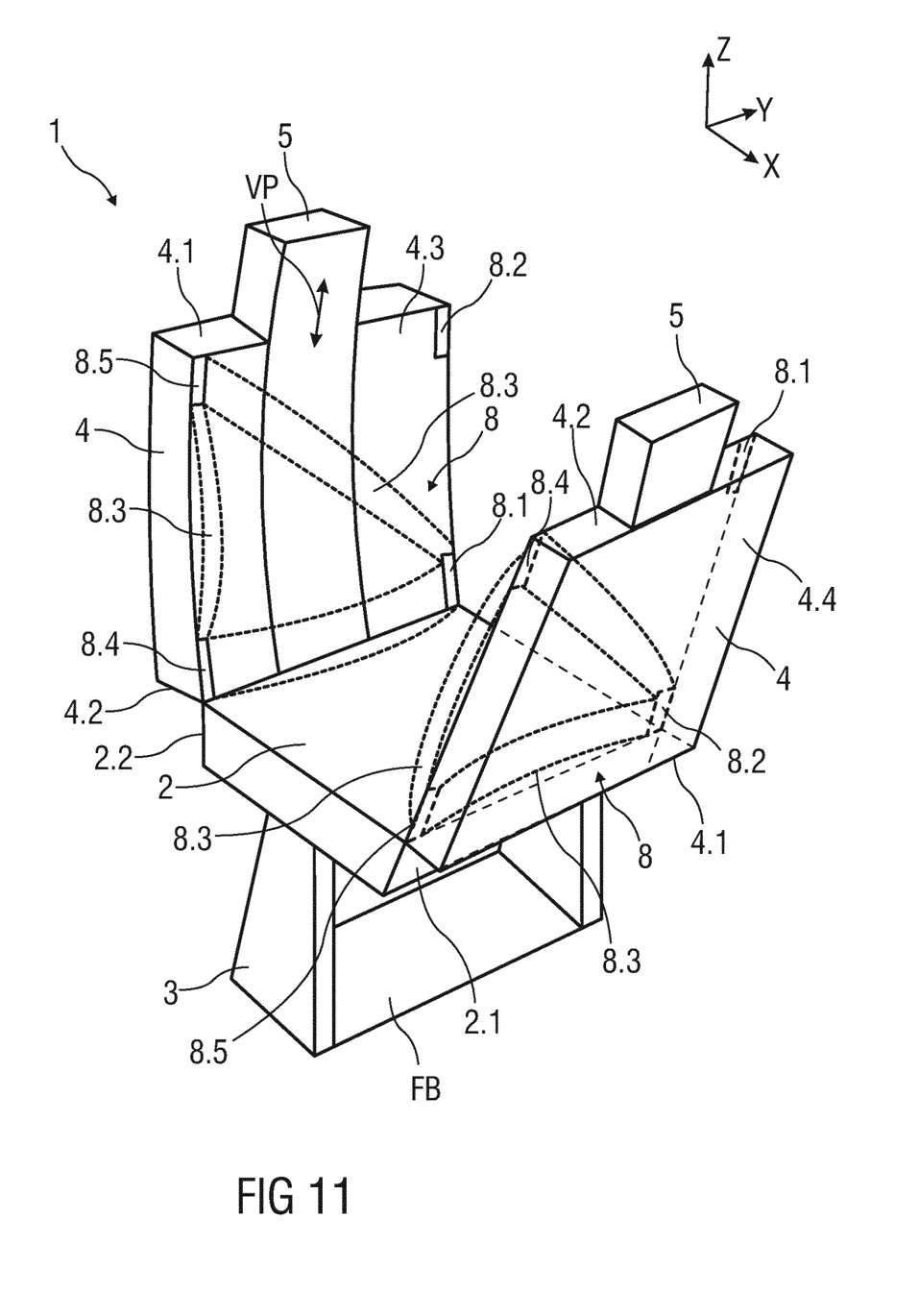

The seat device 1 can be designed, as shown for example in FIG. 11, as a single-seater, or, as shown for example in FIGS. 2 to 4 and 7, as a multiple-seater, here as a two-seater, i.e., as an individual seat, in particular as an individual vehicle seat, having only one seat position, i.e., provided for only one occupant I, or as a bench seat, in particular a vehicle bench seat, having a plurality of seating positions, two in the example depicted here, i.e. provided for a plurality of occupants I sitting side by side in the example depicted here.

The seat device 1 can be designed, for example, as a front or rear vehicle seat or as a front or rear bench seat, i.e., arranged in a first, second or further row of seats of the vehicle. The vehicle can, for example, have one or more such seat devices 1.

Advantageously, at least one headrest unit 5 is arranged on the seat backrest 4 in a displaceable manner in such a way that it can be displaced beyond the backrest edge side 4.1, 4.2 facing away from the seat cushion 2 in each case and can be displaced back under this backrest edge side 4.1, 4.2, as depicted schematically in FIGS. 1, 7, 8 and 11 by means of displacement arrows VP. Advantageously, only one such headrest unit 5 is provided per seat position, correspondingly only one headrest unit 5 in the case of a seat device 1 designed as a single-seater and one headrest unit 5 per seat position in the case of a seat device 1 designed as a multiple-seater, as shown in the examples depicted here. The respective headrest unit 5 is arranged, for example, in the seat back 4, i.e., integrated into it, in particular pushed into it, and can be partially pushed out of it in the manner described, i.e., beyond the respective backrest edge side 4.1, 4.2.

The headrest unit 5 or the respective headrest unit 5 is thus, in accordance with the set seat direction SR and thus in accordance with the respective orientation of the seat back 4, pushed upwards beyond the respective backrest edge side 4.1, 4.2 facing away from the seat cushion 2. During the change of seat direction SR, the headrest unit 5 is pushed back accordingly and, after the new alignment of the seat backrest 4 on the seat cushion 2 has taken place, is pushed upwards beyond the other backrest edge side 4.2, 4.1 now facing away from the seat cushion 2, as depicted in FIG. 1.

In particular, the seat back 4 is rotatably mounted on two lateral pivot arms 6, wherein the transverse axis QA, around which the seat back 4 is rotatable, can be pivoted by means of the pivot arms 6 in the direction of the cushion front side 2.1 and in the direction of the cushion rear side 2.2, as shown in particular in FIGS. 1 to 4. This makes it possible in a simple manner to shift the rotated seat back 4 from the cushion front side 2.1 to the cushion rear side 2.2 and vice versa.

The pivot arms 6 are each mounted on the seat frame 3 in a pivotable manner, for example around a pivot axis SA, which is hinged directly to the seat frame 3 or is hinged to the frame of the seat cushion 2, which is arranged in a pivotable manner on the seat frame 3. The pivot movement of the pivot arms 6 is depicted schematically in FIG. 5 by means of a pivot arrow SP.

Figure 9:
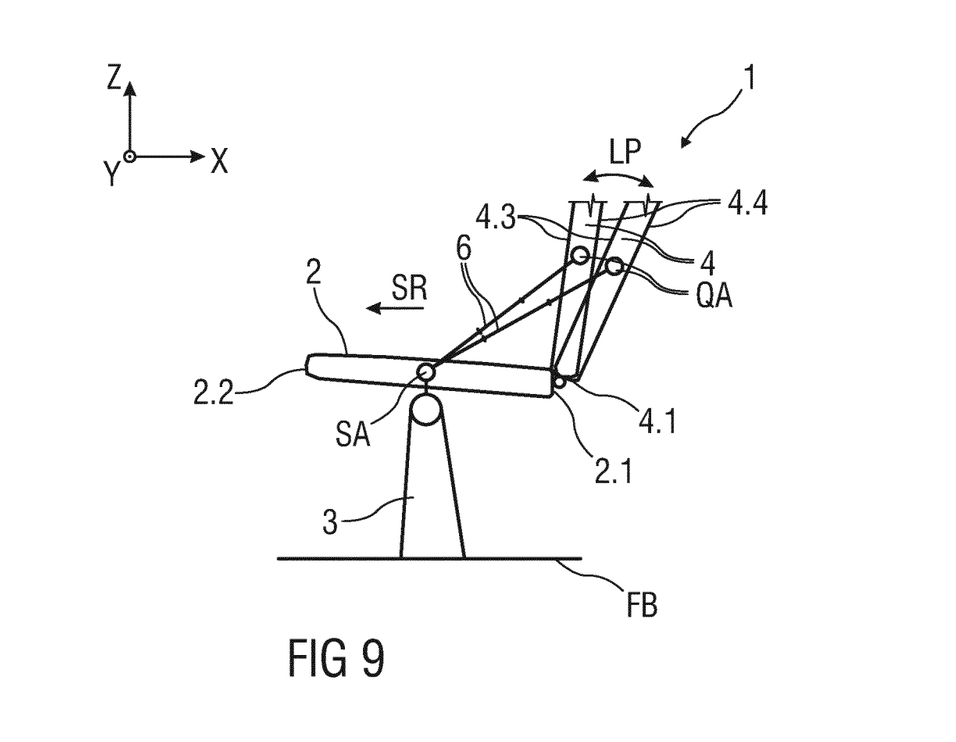

In one possible embodiment, a length of the pivot arms 6 is variable, as shown in FIG. 9. By way of example, the pivot arms 6 are each designed to be telescopic for this purpose, i.e., they each have two or more pivot arm parts which can be moved relative to one another, for example into one another. As a result, in particular a backrest inclination angle of the seat back 4 can be adjusted, as shown in FIG. 9 by a backrest inclination adjustment arrow LP.

Figure 5:
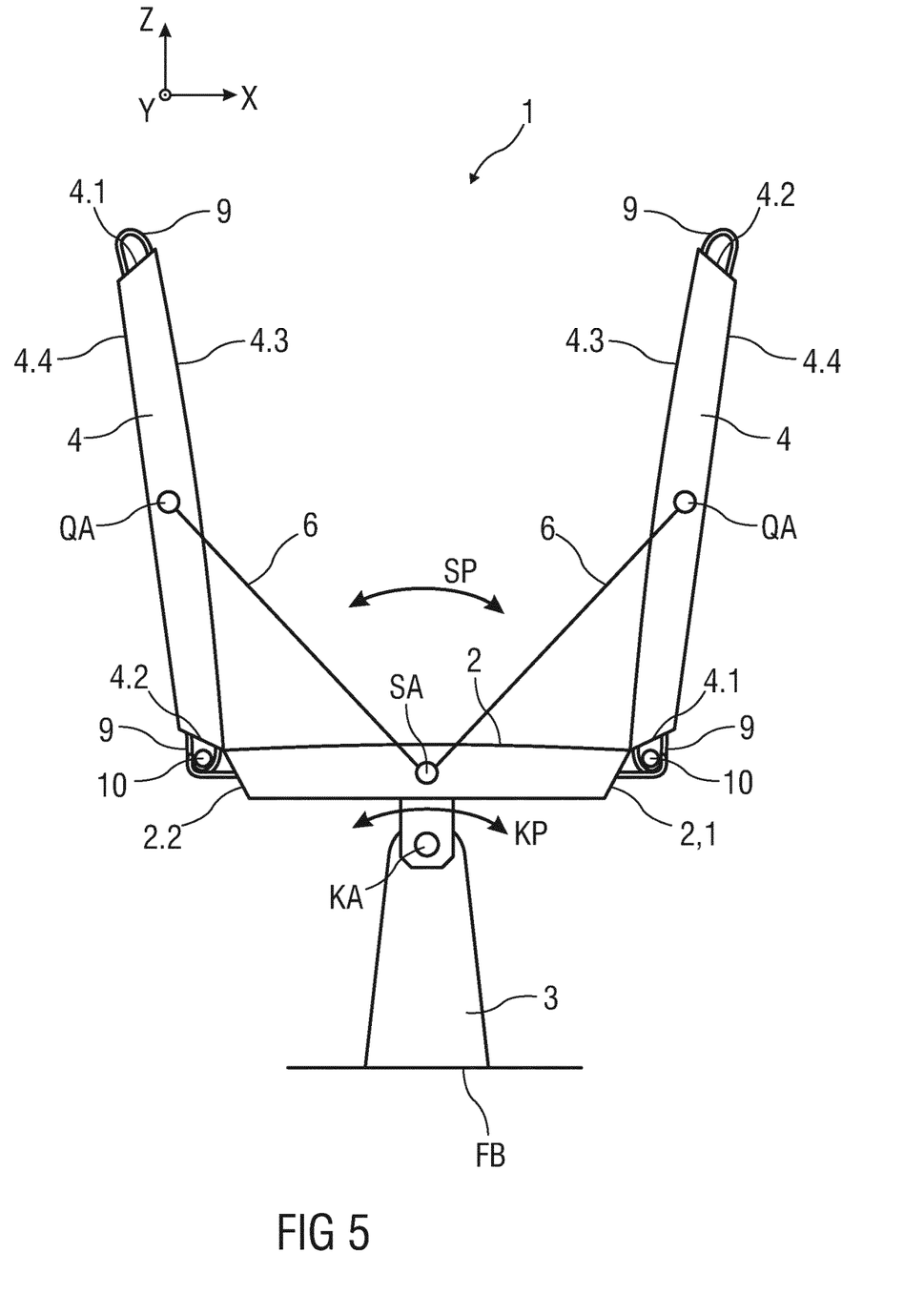

Advantageously, a cushion inclination angle of the seat cushion 2 is adjustable, as shown in FIG. 1 from left to right, depicted schematically in FIG. 5 by means of a cushion inclination adjustment arrow KP, and further shown in FIG.

Figure 6:
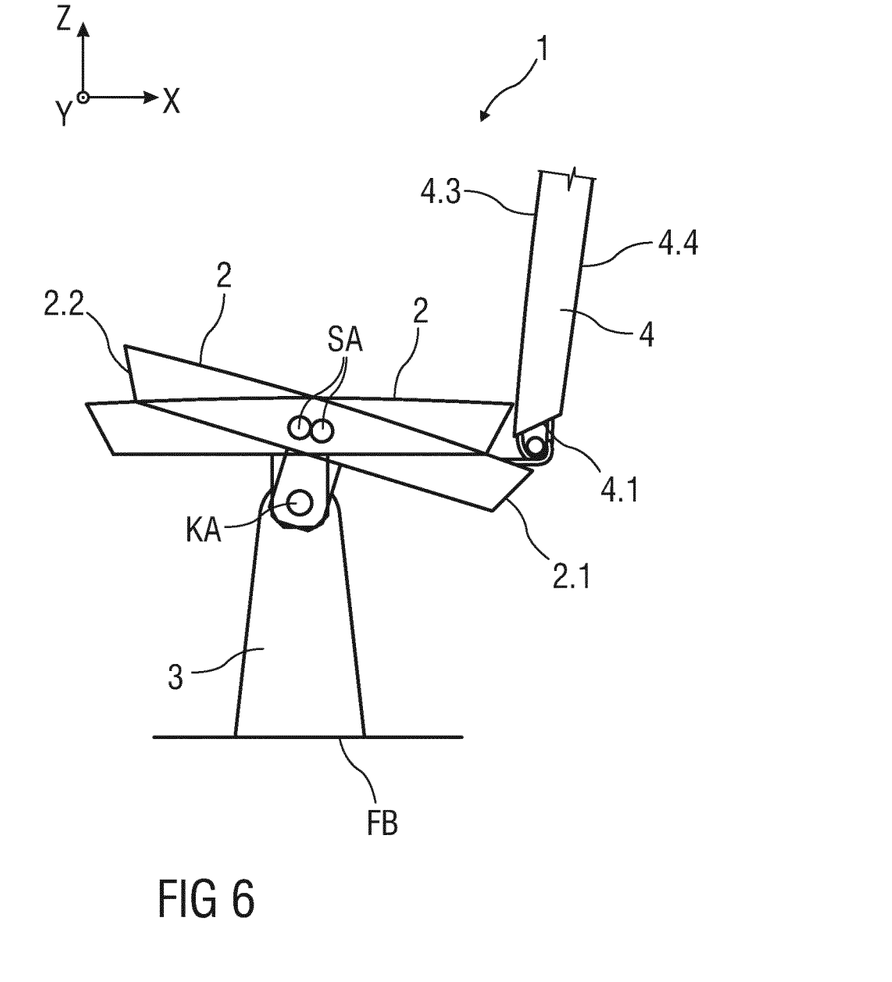
Figure 7:
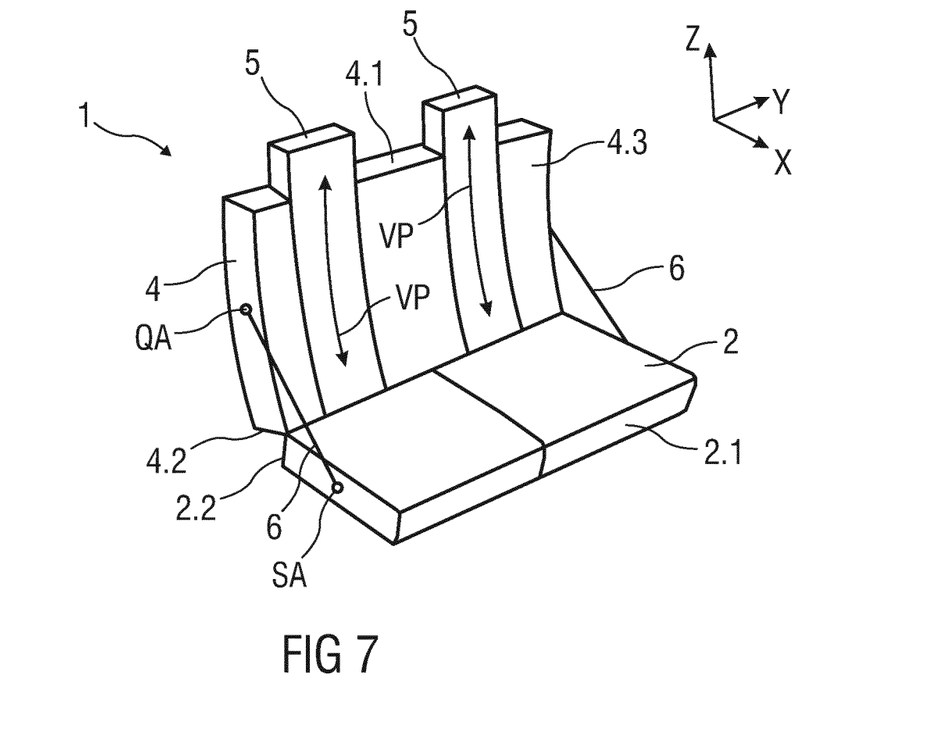
Figure 8:
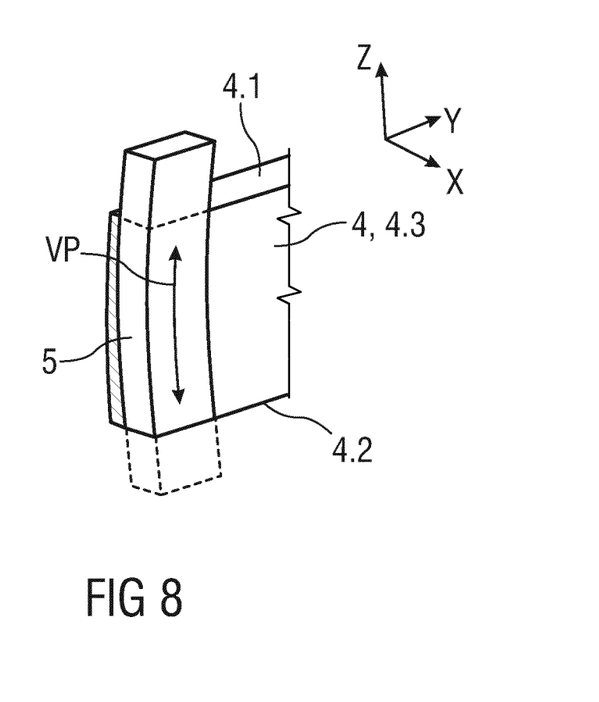

6, in which the seat cushion 2 is depicted in two different cushion inclination angles. In this way, the cushion inclination angle can be adjusted, in particular according to the arrangement of the seat back 4 on the cushion front side 2.1 or the cushion rear side 2.2, such that the respective side of the seat cushion 2, on which the seat back 4 is positioned, is arranged, for example, somewhat lower than the respective other side of the seat cushion 2. For this purpose, the seat cushion 2, as already mentioned above, is pivotably mounted on the seat frame 3, in the depicted example pivotably mounted around a cushion pivot axis KA. By way of example, the cushion inclination angle can be adjusted in a range from +8° to −8°.

The possibility of adjusting the cushion inclination angle and/or the backrest inclination angle enables a comfortable and ergonomically favorable seat setting, in particular for each set seat direction SR.

Figure 10:
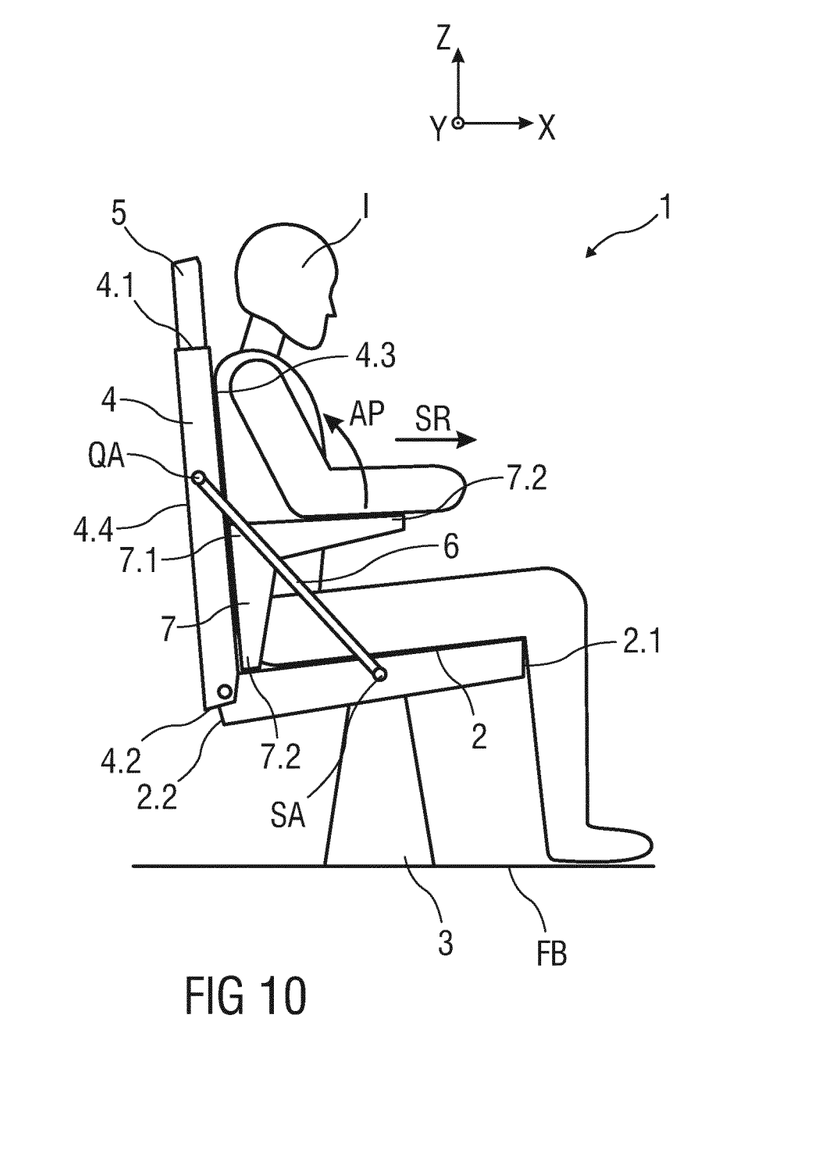

In one possible embodiment, the seat device 1 has at least one pivotable armrest 7, in particular pivotable relative to the seat back 4, as shown in FIG. 10. A pivot movement of the armrest 7 when the seat direction SR is changed is shown schematically by an armrest pivot arrow AP.

By means of the armrest 7, occupant comfort is increased, wherein only one armrest 7 or, for example, only one armrest 7 is required for each arm of the occupant I, since the armrest 7 is pivotable and thus can be pivoted to match the orientation and positioning of the seat back 4. By way of example, one armrest 7 or two armrests 7 are provided per seat. By way of example, the armrest 7 or the respective armrest 7 is pivotably arranged on the seat back 4 or on the pivot arm 6.

By way of example, the armrest 7 or the respective armrest 7 is formed as an angle element, in particular, at least substantially, as a right angle, as shown in FIG. 10. A pivot axis for pivoting the armrest 7 is advantageously located in the area of an angle base 7.1, from which two angle legs 7.2 extend. In this way, depending on the orientation of the seat back 4, one of the two angled legs 7.2 forms an arm support of the arm rest 7, while the other angle leg 7.2 abuts the seat back 4, for example, as a result of which the arm rest 7 is supported on the seat back 4.

In the example depicted in FIG. 10, the seat back 4 is arranged on the cushion rear side 2.2. One of the angle legs 7.2 protrudes from the seat back 4 and forms the arm support for the occupant I, while the other angle leg 7.2 abuts the seat back 4 and supports the armrest 7, for example. When the seat direction SR is changed, i.e., when the seat back 4 is rotated in the manner described and arranged on the cushion front side 2.1, the armrest 7 is also pivoted so that now the angle leg 7.2, which in FIG. 10 protrudes from the seat back 4 and forms the armrest for the occupant I, now abuts, for example, the seat back 4 and supports the armrest 7, while the other angle leg 7.2, which in FIG. 10 abuts, for example, the seat back 4 and supports the armrest 7, then protrudes from the seat back 4 and forms the arm support for the occupant I.

In one possible embodiment, the seat device 1 has at least one three-point seat belt device 8 having two belt buckles 8.1, 8.2, as depicted in FIG. 11. The belt buckles 8.1, 8.2 are each arranged in the region of one of the backrest edge sides 4.1, 4.2 of the seat back 4, such that one of the two belt buckles 8.1, 8.2 is always positioned in the region of the seat cushion 2 in accordance with the alignment and positioning of the seat back 4 on the cushion front side 2.1 or cushion rear side 2.2. The two belt buckles 8.1, 8.2 enable a belt tongue to be engaged in the belt buckle 8.1, 8.2 which is located in the region of the seat cushion 2 and the seat back 4 respectively, depending on the orientation and arrangement of the seat back 4 on the cushion front side 2.1 or cushion rear side 2.2, in order to enable a three-point run of a belt strap 8.3 corresponding to a conventional three-point seat belt, i.e., having a lap belt section and a shoulder belt section.

FIG. 11 shows the belt strap 8.3 in each case in a state of non-use, i.e., with the belt tongue not engaged, in which the belt strap 8.3 is arranged on a side edge region of the seat back 4, and in a state of use, i.e., with the belt tongue engaged in the respective belt buckle 8.1, 8.2 and thus formed three-point arrangement of the belt strap 8.3. The belt strap 8.3 runs in each case through two lateral belt link points 8.4, 8.5 and through the belt tongue, which, in the state of use, is engaged in one of the belt buckles 8.1, 8.2.

The lateral belt link points 8.4, 8.5 are located in a side edge region of the seat back 4, in each case in the region of one of the two backrest edge sides 4.1, 4.2.

The belt buckles 8.1, 8.2 are located in the opposite side edge region of the seat back 4.

Depending on the orientation and positioning of the seat back 4 in relation to the respective seat direction SR, one belt link point 8.4, 8.5 is located at the top of the seat back 4 and the other belt link point 8.5, 8.4 is located at the bottom, as shown in FIG. 11, in which both seat directions SR and the corresponding orientation and arrangement of the seat back 4 on the cushion front side 2.1 or on the cushion rear side 2.2 are depicted. Depending on the orientation and positioning of the seat back 4 in relation to the respective seat direction SR, one belt buckle 8.1 or the other belt buckle 8.2 is used accordingly, i.e., in each case the belt buckle 8.1, 8.2 which is positioned in the region of the seat cushion 2.

Expediently, the seat device 1 has corresponding locking units in order to enable the described adjustment movements of the components of the seat device 1 and to lock the seat device 1 after adjustment has been completed in order to prevent unintentional adjustment. This relates in particular to locking units for enabling or preventing the rotational movement of the seat back 4 and/or the inclination adjustment of the seat cushion 2 and/or the inclination adjustment of the seat back 4 and/or the pivot movement of the respective headrest unit 5 and/or the displacement movement of the respective headrest unit 5 and/or the displacement movement of the seat device 1 on the vehicle floor FB.

By way of example, a plurality of these locking units act together and/or a plurality of adjustment mechanisms act together so that, for example, when the seat direction SR is changed by rotating and positioning the seat back 4, the cushion inclination angle, the respective head restraint unit 5 and/or the respective arm rest 7 are simultaneously adjusted accordingly and/or the seat device 1 is displaced on the vehicle floor FB, wherein the respective locking unit is unlocked before the respective movement and is locked again thereafter.

Such a locking unit, which serves to lock the seat back 4, is shown in FIG. 5, for example. It comprises locking elements 9 on the backrest edge sides 4.1, 4.2 of the seat back 4 and corresponding locking elements 10 on the cushion front side 2.1 and cushion rear side 2.2 of the seat cushion 2. Depending on the width of the seat device 1, distributed in the transverse direction y, for example, two, three or more such locking elements 9, 10 can be provided on the respective backrest edge side 4.1, 4.2 of the seat back 4 and on the cushion front side 2.1 and cushion rear side 2.2 of the seat cushion 2.

In the depicted example, the locking elements 9 on the seat back 4 are each designed, for example, as an eyelet, and the corresponding locking elements 10 on the seat cushion 2 are each designed, for example, as a locking bolt or a detent lug. The reverse assignment or a different design of the locking elements 9, 10 would also be possible.

The described solution enables a flexible seat concept for a vehicle, in particular for an autonomous vehicle or for a vehicle which is capable of autonomous driving at least at times.

By way of example, the vehicle is a vehicle which can be used both as a so-called pool vehicle and as an individual vehicle. By way of example, a pool vehicle drives along a route, wherein people board who do not know each other and prefer the greatest possible degree of privacy. In such a case, the seating direction SR can be set in such a way that the occupants I do not sit opposite each other, but all sit in the same seating direction SR, for example all in the direction of travel FR.

If the vehicle is used as an individual vehicle, for example rented by a group of people who know each other and want to communicate and interact with each other during the journey, the seating direction SR can be changed in such a way that the occupants I sit opposite each other.

The seating device 1 is particularly advantageous in a fully autonomous vehicle, in which there are no pedals and no steering wheel. Then, a corresponding change in the seating direction SR can be made, in particular for one or more seat devices 1 of the front row of seats, to enable an orientation in the direction of a rear row of seats, such that, for example, two occupants I of a seat device 1 designed as a seat bench in the front row of seats and two occupants I of the rear row of seats sit opposite each other. If more privacy is desired, the seating direction SR of the seating device 1 of the front row of seats can be changed again so that all occupants I are again seated in the direction of travel FR.

This can also be done in the manner described above in the case of a vehicle which is only temporarily driving autonomously, for example in the case of a seat device 1 designed as a driver's seat or in the case of a seat device 1 designed as a bench seat in the front row of seats. During a manual driving mode, the seat direction SR is oriented in the driving direction FR so that a vehicle driver faces, for example, a steering wheel and pedals and can guide the vehicle, and during autonomous driving mode, the seat direction SR can be changed so that the vehicle driver then faces rear occupants I and can communicate and interact with them.

Advantageously, in order to allow occupants I to enter and exit the vehicle in both seating directions SR of the seating device 1, the vehicle has correspondingly large door openings.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A vehicle seat device, comprising:
   a seat cushion having a cushion front side running in a transverse direction of the vehicle seat device and a cushion rear side running in the transverse direction of the vehicle seat device, wherein the cushion front side and the cushion rear side each include at least one locking element;
   a seat back having two backrest edge sides opposite each other and each running in the transverse direction of the vehicle seat device, wherein the seat back is configured to be arranged on the cushion front side and on the cushion rear side of the seat cushion in order to change a seat direction, wherein the seat back is mounted so as to be rotatable by at least 180° around a transverse axis in order to change the seat direction, wherein the two backrest edge sides each include at least one locking element, wherein the at least one locking element on the cushion front and rear sides are configured to engage a corresponding one of the at least one locking element on the two backrest edge sides to lock the seat back; and
   at least one headrest unit arranged on the seat back in a displaceable manner in such a way that the at least one headrest unit is displaceable beyond a first one of the two backrest edge sides facing away from the seat cushion and is displaceable under a second one of the two backrest edge sides and is displaceable beyond the second one of the two backrest edge sides facing away from the seat cushion and is displaceable under the first one of the two backrest edge sides.

2. The vehicle seat device of claim 1, wherein the seat back is rotatably mounted on two lateral pivot arms, wherein the transverse axis, about which the seat back is rotatable, is pivotable by the two lateral pivot arms in a direction of the cushion front side and in a direction of the cushion rear side.

3. The vehicle seat device of claim 2, wherein the two lateral pivot arms are configured so that a length of the two lateral pivot arms is adjustable.

4. The vehicle seat device of claim 1, wherein the seat cushion is configured so that a cushion inclination angle of the seat cushion is adjustable.

5. The vehicle seat device of claim 1, further comprising:
   at least one pivotable armrest affixed to the vehicle seat device.

6. The vehicle seat device of claim 1, further comprising:
   at least one three-point seat belt device having two belt buckles.

7. The vehicle seat device of claim 1, wherein the at least one locking element on the two backrest edge sides is an eyelet and the at least one locking element on the cushion front and rear sides is a locking bolt.

8. The vehicle seat device of claim 1, wherein the at least one locking element on the two backrest edge sides is an eyelet and the at least one locking element on the cushion front and rear sides is a detent lug.

9. The vehicle seat device of claim 1, wherein the at least one locking element on the two backrest edge sides is a locking bolt and the at least one locking element on the cushion front and rear sides is an eyelet.

10. The vehicle seat device of claim 1, wherein the at least one locking element on the two backrest edge sides is a detent lug and the at least one locking element on the cushion front and rear sides is an eyelet.

11. A vehicle seat device, comprising:
- a seat cushion having a cushion front side running in a transverse direction of the vehicle seat device and a cushion rear side running in the transverse direction of the vehicle seat device;
- a seat back having two backrest edge sides opposite each other and each running in the transverse direction of the vehicle seat device, wherein the seat back is configured to be arranged on the cushion front side and on the cushion rear side of the seat cushion in order to change a seat direction, wherein the seat back is mounted so as to be rotatable by at least 180° around a transverse axis in order to change the seat direction;
- at least one headrest unit arranged on the seat back in a displaceable manner in such a way that the at least one headrest unit is displaceable beyond a first one of the two backrest edge sides facing away from the seat cushion and is displaceable under a second one of the two backrest edge sides and is displaceable beyond the second one of the two backrest edge sides facing away from the seat cushion and is displaceable under the first one of the two backrest edge sides; and
- at least one three-point seat belt device having two belt buckles, wherein the two belt buckles are each arranged in a region of one of the two backrest edge sides of the seat back.

12. A vehicle, comprising:
- a vehicle interior; and
- at least one vehicle seat device arranged in the vehicle interior, wherein the at least one vehicle seat device comprises
  - a seat cushion having a cushion front side running in a transverse direction of the vehicle seat device and a cushion rear side running in the transverse direction of the vehicle seat device, wherein the cushion front side and the cushion rear side each include at least one locking element;
  - a seat back having two backrest edge sides opposite each other and each running in the transverse direction of the vehicle seat device, wherein the seat back is configured to be arranged on the cushion front side and on the cushion rear side of the seat cushion in order to change a seat direction, wherein the seat back is mounted so as to be rotatable by at least 180° around a transverse axis in order to change the seat direction, wherein the two backrest edge sides each include at least one locking element, wherein the at least one locking element on the cushion front and rear sides are configured to engage a corresponding one of the at least one locking element on the two backrest edge sides to lock the seat back; and
  - at least one headrest unit arranged on the seat back in a displaceable manner in such a way that the at least one headrest unit is displaceable beyond a first one of the two backrest edge sides facing away from the seat cushion and is displaceable under a second one of the two backrest edge sides and is displaceable beyond the second one of the two backrest edge sides facing away from the seat cushion and is displaceable under the first one of the two backrest edge sides.

13. The vehicle of claim 12, wherein the seat device is arranged on a floor of the vehicle in a displaceable manner.

14. The vehicle of claim 12, wherein the at least one locking element on the two backrest edge sides is an eyelet and the at least one locking element on the cushion front and rear sides is a locking bolt.

15. The vehicle of claim 12, wherein the at least one locking element on the two backrest edge sides is an eyelet and the at least one locking element on the cushion front and rear sides is a detent lug.

16. The vehicle of claim 12, wherein the at least one locking element on the two backrest edge sides is a locking bolt and the at least one locking element on the cushion front and rear sides is an eyelet.

17. The vehicle of claim 12, wherein the at least one locking element on the two backrest edge sides is a detent lug and the at least one locking element on the cushion front and rear sides is an eyelet.

* * * * *